(12) United States Patent
Krueger

(10) Patent No.: US 6,864,649 B2
(45) Date of Patent: Mar. 8, 2005

(54) METHOD AND APPARATUS FOR SUPPLYING CURRENT TO AN ELECTRONICALLY COMMUTATABLE ELECTRIC MOTOR

(75) Inventor: Hartmut Krueger, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/665,769

(22) Filed: Sep. 19, 2003

(65) Prior Publication Data

US 2004/0070354 A1 Apr. 15, 2004

(30) Foreign Application Priority Data

Oct. 14, 2002 (DE) .......................... 102 47 900

(51) Int. Cl.[7] ................................ H02P 7/06
(52) U.S. Cl. .................... 318/254; 318/138; 318/432
(58) Field of Search ............................. 318/254, 138, 318/439

(56) References Cited

U.S. PATENT DOCUMENTS

| 4,686,436 A | * | 8/1987 | Archer ..................... 318/254 |
| 4,882,511 A | | 11/1989 | von der Heide ............. 310/67 |
| 5,719,484 A | * | 2/1998 | Taniguchi et al. ........... 322/20 |
| 6,452,349 B1 | * | 9/2002 | Hahn et al. ................ 318/254 |

FOREIGN PATENT DOCUMENTS

DE        29 30 863 A1     4/1981

* cited by examiner

Primary Examiner—Rita Leykin
(74) Attorney, Agent, or Firm—Michael J. Striker

(57) ABSTRACT

A method and an apparatus for current supply of an electronically commutated electric motor by a semiconductor power end stage are described, which has an arrangement for ascertaining the current received by the motor and an electronic controller for controlling the branch currents of the motor. For this purpose the electronic controller receives an input signal from a single current sensor (24) in a common conductor (26) of the semiconductor switches of the end stage, the terminal voltages ($U_1$, $U_2$, $U_3$) of the individual branch windings (16, 18, 20) as well as the total voltage (U) applied to the end stage. From these input voltages and the input signal the electronic controller determines respective voltage drops at the individual semiconductor switches under logical incorporation of control signals ($G_1$–$G_6$) produced by the electronic controller. For the voltage drop at a particular semiconductor switch its respective conducting state D.C. resistance can be ascertained, so that additional current sensors in the individual branches for controlling the branch currents ($I_1$, $I_2$, $I_3$) are not necessary.

10 Claims, 2 Drawing Sheets

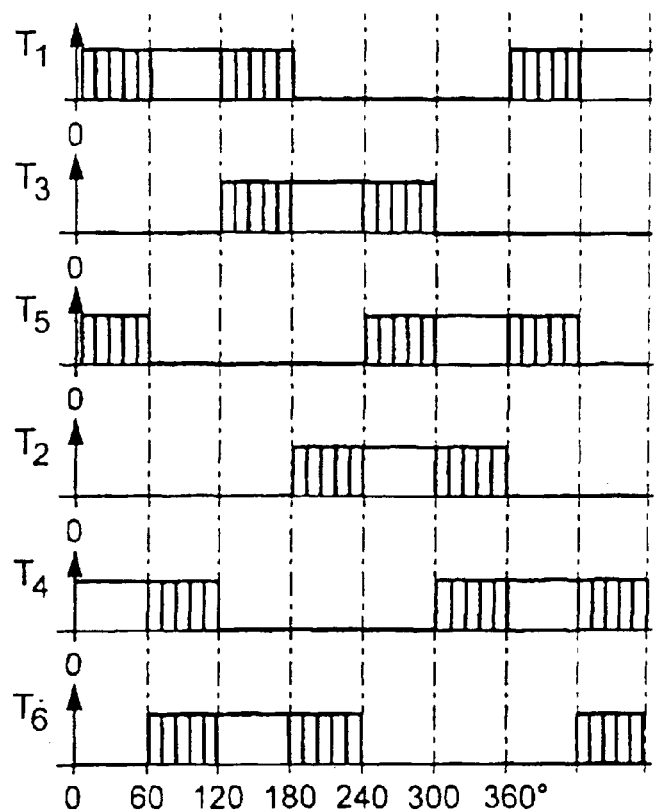
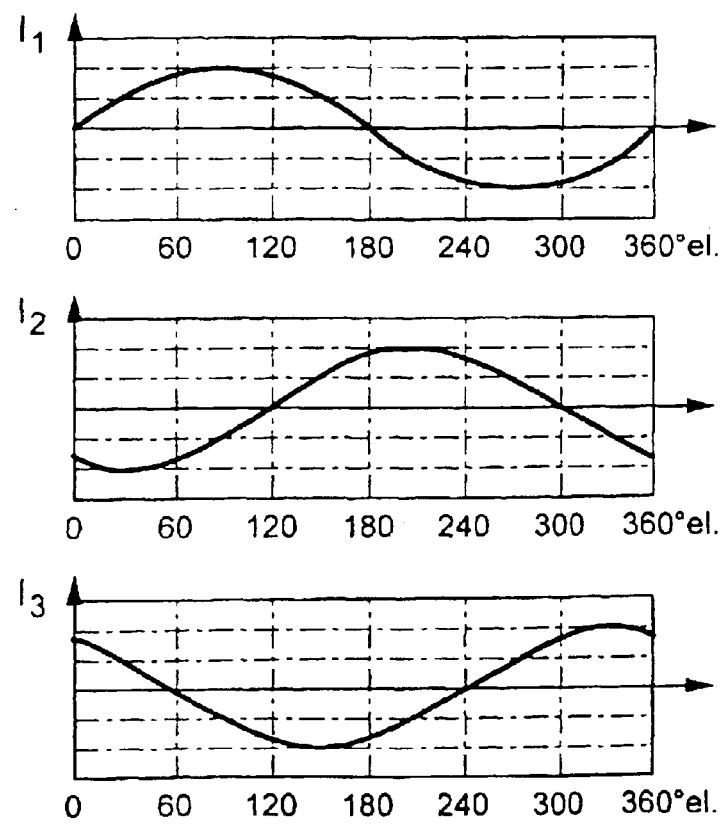
Fig. 3a
Fig. 3b

METHOD AND APPARATUS FOR SUPPLYING CURRENT TO AN ELECTRONICALLY COMMUTATABLE ELECTRIC MOTOR

BACKGROUND OF THE INVENTION

The invention is based on a method and apparatus for supplying current to an electronically commutated electric motor by a semiconductor power end stage, as disclosed in DE 29 30 863 A. This reference describes a method for load current determination in a direct current converter. A circuit for performing the method includes a bridge circuit connected to a voltage source. The load current is determined from currents flowing through the bridge branches. An electronic controller switches the phase currents of the motor accordingly. For this purpose a current detection device is arranged in each bridge branch.

SUMMARY OF THE INVENTION

It is an object of the present invention to provide a simpler and more economical method and an associated circuit means for controlling the phase currents of an electronically commutated electric motor, preferably of a three-phase electric machine.

This object and others, which will be made more apparent hereinafter, are attained in a method for supplying current to an electronically commutated electric motor, especially a three-phase direct current motor, by a semiconductor power end stage, with means for measuring the current delivered to the motor and with an electronic controller for branch currents of the motor.

In the method according to the invention only one current sensor is provided in the intervening circuit, i.e. the semiconductor end stage, in a common conductor for the semiconductor switches of the semiconductor power end stage and the electronic controller is supplied with a signal from the current sensor, the terminal voltages of the individual circuit branches and the total voltage applied to the power end stage. The respective conducting state D.C. resistances of the semiconductor switches and/or the branch currents are determined from these signals and voltages by the electronic controller under logical inclusion of control signals produced by the electronic controller.

Preferably the semiconductor power end stage comprises MOSFET semiconductor switches, whose drain-source branches operate as current sensors. Because of this feature of the invention additional current sensors can be eliminated. A reduction of electrical losses, for example at a shunt, results as well as a construction cost savings. Also information regarding the conduction resistances in the individual semiconductor switches of the bridge branches of the power end stage is obtained.

It has proven advantageous to use a microcomputer as electronic controller for controlling the current supply, which for this purpose ascertains the voltage drops at the respective semiconductor switches from the difference of the total voltage applied to the power end stage and the corresponding the terminal voltages. Alternatively all six drain-source voltages can also be directed detected. The rotary position signals of a rotor position transmitter are preferably also supplied to the electronic controller for producing the control signals for the semiconductor switches. The semiconductor power end stage preferably is a semiconductor bridge circuit in the form of a so-called B6-converter bridge circuit, in which the terminal voltages of the branch windings are read off or measured at corresponding connection points of respective connected pairs of the semiconductor switches and fed to the electronic controller. An especially simple structure results for the circuit apparatus according to the invention using readily accessible control signals.

In a preferred embodiment a determination of the respective conducting state D.C. resistances of the semiconductor switches occurs at a definite time point within the respective clock cycles in such a way that transients occurring when the semiconductor switches have been turned on have decayed. Thus the measurement results are not incorrect or faulty because of transient resistances shortly after control. Similarly a reconstruction of the branch currents can be performed with the help of the measured conducting state D.C. resistances and the measured currents.

The method according to the invention and the given circuit arrangement according to the invention is appropriate for a three-phase electronically commutated direct current motor (BLDC motor) with windings that are Y-connected, in which the individual motor branches are connected to the respective connections of the semiconductor switches of B6-converter bridge circuit. The method according to the invention is however not limited to this type of motor, but is suitable for other motors, for example for switched reluctance motors, asynchronous or synchronous machines and for traversal flow motors. Moreover other converter types can be used, for example the so-called H-bridge with separate bridge branches for each motor branch.

Additional features and advantageous embodiments of the invention are described in the dependent claims appended below and in the description of the examples of the invention.

BRIEF DESCRIPTION OF THE DRAWINGS

The objects, features and advantages of the invention will now be described in more detail with the aid of the following description of the preferred embodiments, with reference to the accompanying figures in which:

FIG. 3a is graphical illustration showing control signal envelope curves for 180° sinusoidal currents supplied to the three-phase electric motor; and FIG. 3b is graphical illustration showing the behavior of branch currents with a 180° sinusoidal current supply.

DESCRIPTION OF THE PREFERRED EMBODIMENTS

Main Circuit Structure

Figure 1:
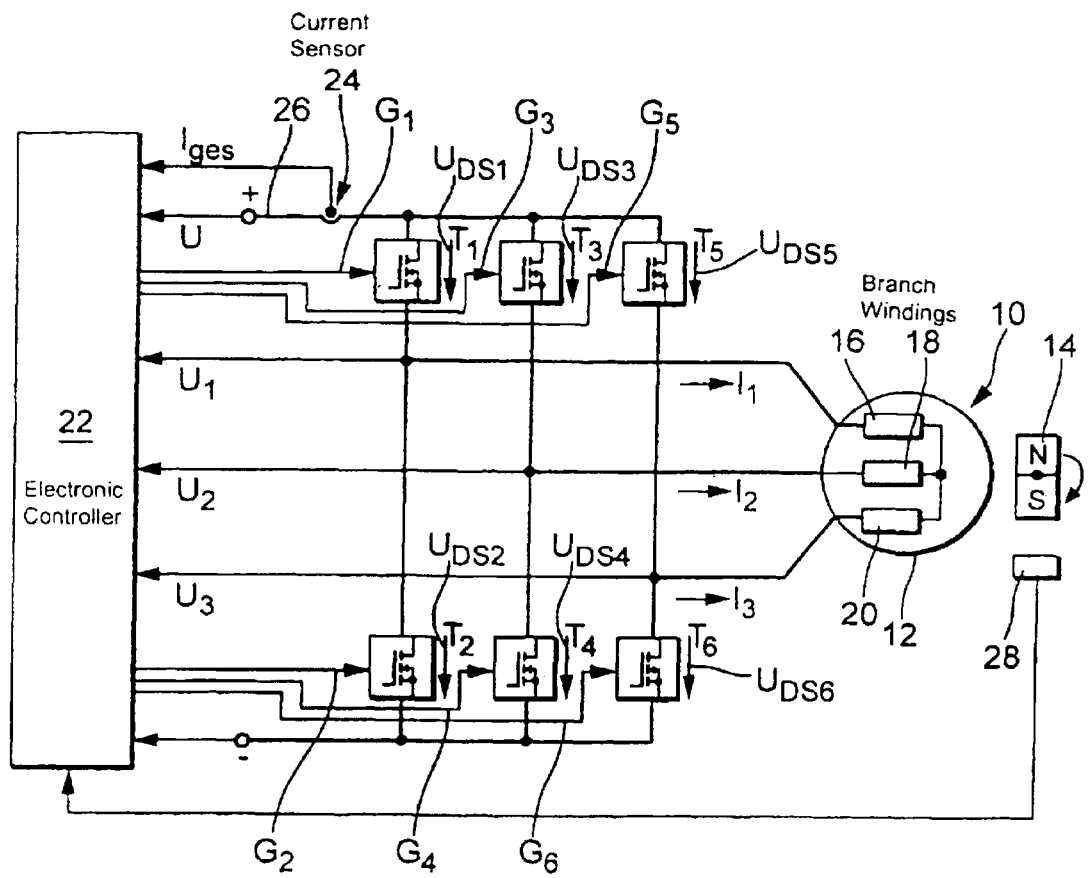
FIG. 1 is a schematic diagram of a circuit arrangement according to the invention for supplying current to an electronically commutated electric motor.

FIG. 1 illustrates the principle circuit for current supply of an electronically commutated electric motor 10 by means of a semiconductor power end stage. The electric motor 10 comprises a stator 12 and a rotor 14. The winding branches of the stator 12 are designated 16, 18, 20 in FIG. 1. Branch currents $I_1$, $I_2$ and $I_3$ are supplied to the respective winding branches 16, 18 and 20.

The semiconductor power end stage for current supply of the electric motor 10 comprises MOSFET transistors $T_1$–$T_6$, which are connected in a halfbridge circuit (B6-converter bridge circuit). The drain-source voltages of the transistor power switches $T_1$–$T_6$ are designed $U_{DS1}$–$U_{DS6}$. The switches $T_1$, $T_3$ and $T_5$ are connected on their drain side with the plus pole of a direct current source. The source terminals of the switches $T_2$, $T_4$ and $T_6$ are connected to the minus pole of a direct current source with the voltage U. Further the source terminals of the switches $T_1$, $T_3$ and $T_5$ are connected, on the one hand, with the drain electrodes of the $T_2$, $T_4$ and $T_6$ and, on the other hand, with the terminals of the winding branches 16, 18, 20, whose other terminals are connected in a Y-connection.

A microcomputer (controller) 22 provides means for controlling the MOSFET switches $T_1$–$T_6$ and thus for controlling the current supplied to the electric motor 10 and also for amplifying control signals. The signal of a single current sensor 24 is supplied to the microcomputer 22. The current sensor 24 is arranged in the common conductor 26 between the plus pole of the direct current source and the drain terminals of the transistors $T_1$, $T_3$ and $T_5$. The microcomputer 22 receives, as additional input signals, the terminal voltages $U_1$, $U_2$ and $U_3$ of the individual motor branches, which correspond to the source voltages of the switches $T_1$, $T_3$ and $T_5$ and the drain voltages of the switches $T_2$, $T_4$ and $T_6$ respectively. Furthermore the microcomputer (controller) 22 is connected with an output of a rotor position transmitter 28. On the output side the microcomputer (controller) 22 supplies control signals $G_1$ to $G_6$ to the MOSFET switches $T_1$–$T_6$.

Main Circuit Operation

Figure 2:
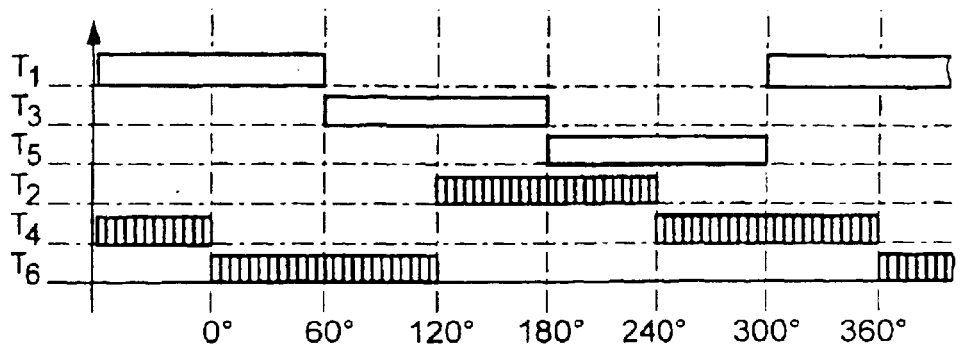
FIG. 2 is a graphical illustration showing control signal envelope curves with 120° block currents supplied to the three-phase electric motor.

After switching the circuit on, the D.C. voltage U is applied to the input terminal of the power end stage with the MOSFET switches $T_1$–$T_6$ and to the microcomputer (controller) 22. The switches $T_1$–$T_6$ receive the input signals according to the enclosed curves shown in FIGS. 2 and 3a. These switches $T_1$–$T_6$ are switched to their conductive states for producing the branch currents $I_1$–$I_3$ through the winding branches 16, 18, 20 according to these input signals. The control signals according to FIG. 2 are a matter of block control signals with respective currents over 120°, so that the current curves correspond to the control signal curves in the ideal case. The transistors $T_1$, $T_3$ and $T_5$ are continuously conducting during the respective supplied current blocks, the magnitudes of the currents $I_1$, $I_2$ and $I_3$ are attained by clocking the MOSFET switches $T_2$, $T_4$ and $T_6$. Sinusoidal currents $I_1$, $I_2$ and $I_3$ with a half-wave duration of 180° are produced with a current supply according to FIGS. 3a and 3b. Herein the input side MOSFET switches $T_1$, $T_3$ and $T_5$ and the output side switches $T_2$, $T_4$ and $T_6$ are switches pulsed for producing the sinusoidal current supply.

The microcomputer (controller) 22 receives a signal produced by current sensor 24 corresponding to the total input current $I_{ges}$ of the power end stage, the terminal voltages $U_1$, $U_2$ and $U_3$ and a signal from the rotor position transmitter 28 providing information regarding the rotation position of the permanent magnet rotor 14, as input signals. The microcomputer (controller) 22 produces control signals $G_1$–$G_6$ for the MOSFET switches $T_1$–$T_6$ from these input signals according to the predetermined supply current behavior.

In the B6-converter bridge circuit in the embodiment illustrated with 6 MOSFET switches $T_1$–$T_6$ and a three-phase electronically commutated D.C. motor with a start connection and with permanent magnet excitation (BLDC motor) the voltage U applied to the bridge as well as the respective voltage drops at the output side MOSFET switches $T_2$, $T_4$ and $T_6$, which correspond to the terminal voltages of the individual winding branches 16, 18, 20, are measured as input signals for the microcomputer 22. The drain-source voltages $U_{DS}$ of the transistors $T_1$–$T_6$ are determined by the microcomputer (controller) 22. This results in the following relationships: $U_{DS1}$=U–$U_1$; $U_{DS3}$=U–$U_2$; $U_{DS5}$=U–$U_3$; $U_{DS2}$=$U_1$; $U_{DS4}$=$U_2$; $U_{DS6}$=$U_3$.

Moreover the total current signal $I_{ges}$ at the input of the current end stage is measured. The logical control signals $G_1$–$G_6$ for the switches $T_1$–$T_6$ for control of the phase curves are derived from it. The control signals $G_1$–$G_6$ are formed in the microcomputer (controller) 22 and are available without more effort.

In order to perform the method according to the invention which of the switches $T_1$–$T_6$ is conducting and which is blocked is first determined and the allocation occurs, in which transistor exactly the measured current flows, which means which switch is controlled with the gate controlling signal "1". The switches $T_1$–$T_6$ conduct via their inverse diodes also in free-running, however in that case the voltage drop is negative and it is under a definite bounding value.

Control signals $G_1$–$G_6$ are formed in the microcomputer (controller) 22 with the help of signals from the rotor position transmitter 28 and are available. The total current $I_{ges}$ flows in one of the switches $T_1$–$T_6$, when it is the switch conducting the sole current of the three input side switches $T_1$ $T_3$, $T_5$ or the three output side switches $T_2$, $T_4$, $T_6$. Additional current sensors besides the sensor 24 are not needed in the method according to the invention since the MOSFET switches $T_1$–$T_6$ themselves can be called upon as current sensors. The property of the power end stage that at least one MOSFET switch conducts the measured total current $I_{ges}$ in the current supplying state can be used to determine the resistance of the drain-source branch $R_{DS}$ in these MOSFET switches. When one of the switches $T_1$–$T_6$ conducts the total current $I_{ges}$, its conducting state D.C. resistance is given by $R_{DS}$=$U_{DS}$/$I_{ges}$. Thus the conducting state D.C. resistance is obtained for each MOSFET switch $T_1$–$T_6$ for the respective conducting of the total current $I_{ges}$ within one electrical cycle of the motor 10. Temperature-dependent changes of the conducting state D.C. resistance is detected by frequent updating of the measured value. In order to minimize other interfering influences the measured values can be made more accurate by linear or non-linear filtering, for example by low-pass filtering. At the time at which the branch current is not identical with the measured current $I_{ges}$ the branch current can be determined by the relationship $I_{1-3}$=$U_{DS}$/$R_{DS}$ with the help of the measured drain-source voltage of the corresponding MOSFET and the corresponding value for $R_{DS}$ of the branch current.

It has proven advantageous when the measurement and evaluation of the necessary variables take place at definite time periods, especially so that the measured values obtained shortly after the known switching times occur within one clock or pulse cycle. This guarantees that the transient switching process of the concerned MOSFET switch is decaying so that the transient resistance, which is active shortly after the controlling, does not influence the measurement result.

The measurement of the drain-source voltages UDS of the MOSFET switches $T_1$–$T_6$ preferably occurs by means of a voltage divider comprising a series circuit including an ohmic resistance and a capacitor, in which the voltage at the connection point between the components is fed to the microcomputer (controller) 22 via an amplifier and an analog-digital converter with an analysis circuit. The analog-digital converter is preferably part of the microcomputer.

A conventional pulse frequency for the control of the MOSFET switches $T_1$–$T_6$ is 20 kHz. In order to obtain exact measurement results during the determination of the voltage drop $U_{DS}$ in the drain-source branch of the MOSFET switches $T_1$–$T_6$ it is appropriate when the motor currents $I_1$–$I_3$ are about 10 A or more. This sort of motor can be successfully used as a drive motor in a motor vehicle, in which features for reducing costs due to a large number of component parts, in the present case especially for reducing the number of current sensors, are especially important.

The disclosure in German Patent Application 102 47 900.3 of Oct. 14, 2002 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method and apparatus for supplying current to an electronically commutable electric motor, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

What is claimed is:

1. A method for supplying current to an electronically commutated electric motor, especially a three-phase direct current motor, by a semiconductor power end stage, with means for measuring the current delivered to said motor and with an electronic controller for controlling branch currents of said motor, said method comprising the steps of:
   a) supplying to said electronic controller a signal from a current sensor (24) in a common conductor (26) of semiconductor switches of said semiconductor power end stage, winding terminal voltages ($U_1, U_2, U_3$) of respective branch windings (16, 18, 20) of said motor and a total supply voltage (U) applied to said semiconductor power end stage; and
   b) determining respective conducting state D.C. resistances of the semiconductor switches and said branch currents ($I_1, I_2, I_3$) with said electronic controller from said signals and voltages supplied to said electronic controller with logical incorporation of control signals ($G_1$–$G_6$) produced by said electronic controller.

2. The method as defined in claim 1, wherein said electronic controller computes respective voltage drops in drain-source branches of said semiconductor switches from corresponding differences between said total voltage applied to the semiconductor power end stage and said respective winding terminal voltages ($U_1, U_2, U_3$) of said branch windings (16, 18, 20).

3. A method for supplying current to an electronically commutated electric motor, especially a three-phase direct current motor, by a semiconductor power end stage, with means for measuring the current delivered to said motor and with an electronic controller for controlling branch currents of said motor, said method comprising the steps of:
   a) supplying to said electronic controller a signal from a current sensor (24) in a common conductor (26) of semiconductor switches of said semiconductor power end stage and individual voltages ($U_{DS1}$–$U_{DS6}$) at respective ones of the semiconductor switches; and
   b) determining respective conducting state D.C. resistances of the semiconductor switches and said branch currents ($I_1, I_2, I_3$) with said electronic controller from said signals and said voltages supplied to said electronic controller with logical incorporation of control signals ($G_1$–$G_6$) produced by said electronic controller.

4. The method as defined in claim 3, wherein said semiconductor switches of said semiconductor power end stage are MOSFET transistors ($T_1$–$T_6$), said MOSFET transistors have drain-source branches operated as respective current sensors with the help of said individual voltages ($U_{DS1}$–$U_{DS6}$) and said conducting state D.C. resistances ($R_{DS1}$–$R_{DS6}$) for said MOSFET transistors.

5. The method as defined in claim 3, wherein said electronic controller is a microcomputer (22).

6. The method as defined in claim 3, further comprising supplying rotary position signals of a rotor position transmitter (28) to said electronic controller to produce said control signals ($G_1$–$G_6$) for said semiconductor switches.

7. The method as defined in claim 3, wherein said semiconductor power end stage is a half-bridge circuit, and further comprising acquiring respective terminal voltages ($U_1$–$U_3$) of the branch windings of the motor at corresponding connection points of respective connected pairs of said semiconductor switches and supplying said respective terminal voltages to said electronic controller.

8. The method as defined in claim 3, wherein the determining of the respective conducting state D.C. resistances ($R_{DS}$) of the semiconductor switches takes place at definite time points within respective clock cycles, after transients due to a switch-on process for the semiconductor switches have decayed.

9. An apparatus for supplying current to an electronically commutated electric motor, especially a three-phase direct current motor, with means for determining said current supplied to said motor; said apparatus comprising
   a semiconductor power end stage comprising semiconductor switches, said semiconductor switches comprising means for controlling branch currents in branch windings of said motor;
   an electronic controller for controlling said branch currents; said electronic controller comprising a microcomputer (22);
   a current sensor (24) arranged in a common conductor (26) of the semiconductor switches to supply a signal depending on a current in said common conductor to said electronic controller;
   means for supplying terminal voltages ($U_1, U_2, U_3$) of said branch windings (16, 18, 20) to said electronic controller;
   a rotor position transmitter (28) for supplying a signal characteristic of a rotary position of a rotor of said motor to said electronic controller as an input signal; and
   means for supplying a total voltage (U) applied to the semiconductor end stage or respective individual voltages ($U_{DS1}$-$U_{DS6}$) at corresponding ones of said semiconductor switches to said electronic controller;
   wherein said electronic controller comprising means for generating control signals ($G_1$–$G_6$) for said semiconductor switches in order to control said branch currents from said signal characteristic of said rotary position of said rotor, said signal from said current sensor (24), and from said respective individual voltages ($U_{DS1}$–$U_{DS6}$) at said semiconductor switches or said total voltage applied to the semiconductor end stage and said terminal voltages ($U_1, U_2, U_3$) of said branch windings (16, 18, 20).

10. The apparatus as defined in claim 9, wherein said semiconductor end stage is a half-bridge circuit and said motor is a three-phase electronically commutated direct current motor with branch windings connected in a Y-connection and also connected with corresponding connection points of respective connected ones of said semiconductor switches.

* * * * *